United States Patent
Boehnke et al.

(10) Patent No.: US 10,892,931 B2
(45) Date of Patent: Jan. 12, 2021

(54) FILTERED MULTI-CARRIER COMMUNICATIONS

(71) Applicant: Huawei Technologies Duesseldorf GmbH, Duesseldorf (DE)

(72) Inventors: Ronald Boehnke, Munich (DE); Malte Schellmann, Munich (DE); Zhao Zhao, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 0 days.

(21) Appl. No.: 16/287,776

(22) Filed: Feb. 27, 2019

(65) Prior Publication Data

US 2019/0199567 A1 Jun. 27, 2019

Related U.S. Application Data

(63) Continuation of application No. PCT/EP2016/070463, filed on Aug. 31, 2016.

(51) Int. Cl.
H04L 27/26 (2006.01)
H04L 25/03 (2006.01)

(52) U.S. Cl.
CPC ...... *H04L 27/264* (2013.01); *H04L 25/03305* (2013.01); *H04L 25/03834* (2013.01); *H04L 27/263* (2013.01); *H04L 27/2631* (2013.01); *H04L 27/2633* (2013.01)

(58) Field of Classification Search
None
See application file for complete search history.

(56) References Cited

U.S. PATENT DOCUMENTS 4,135,057 A * 1/1979 Bayless, Sr. ...... H04L 25/03127
375/280
4,314,204 A * 2/1982 Biehl ...................... H01P 7/06
324/316

(Continued)

FOREIGN PATENT DOCUMENTS

CN 1925474 A 3/2007
CN 105612725 B 11/2019

(Continued)

OTHER PUBLICATIONS

Huawei et al., "f-OFDM scheme and filter design, 3GPP Draft, R1-165425, May 2016" (Year: 2016).*

(Continued)

*Primary Examiner* — Berhanu Tadese
(74) *Attorney, Agent, or Firm* — Leydig, Voit & Mayer, Ltd.

(57) ABSTRACT

An apparatus for processing data symbols in a multi-carrier transmitter, includes a transmit pulse shaper and a transmit sub-band filter. The transmit pulse shaper is adapted to filter a plurality of data pulses with respective transmit pulse shaping filters. Each of the data pulses is associated with a respective carrier of the multi-carrier communication system. The transmit sub-band filter is adapted to perform sub-band filtering of the pulse-shaped data pulses. The sub-band filter and at least one of the transmit pulse shaping filters are correlated. This correlation may be achieved by jointly designing the sub-band filter and the pulse shaping filter(s).

13 Claims, 6 Drawing Sheets

(56) References Cited

U.S. PATENT DOCUMENTS

| | | | | |
|---|---|---|---|---|
| 5,659,270 A * | 8/1997 | Millen | | H03L 1/028 |
| | | | | 310/315 |
| 5,675,252 A * | 10/1997 | Podney | | G01R 33/02 |
| | | | | 324/209 |
| 5,962,786 A * | 10/1999 | Le Traon | | G01P 15/097 |
| | | | | 310/323.01 |
| 6,194,900 B1 | 2/2001 | Freeman | | G01R 33/302 |
| | | | | 324/318 |
| 6,483,480 B1 * | 11/2002 | Sievenpiper | | H01Q 3/44 |
| | | | | 343/700 MS |
| 6,812,903 B1 * | 11/2004 | Sievenpiper | | H01Q 3/12 |
| | | | | 343/753 |
| 7,575,807 B1 * | 8/2009 | Barvosa-Carter | | F03G 7/065 |
| | | | | 428/411.1 |
| 7,716,985 B2 * | 5/2010 | Zhang | | G01P 15/0907 |
| | | | | 73/514.34 |
| 7,774,155 B2 * | 8/2010 | Sato | | A63F 13/06 |
| | | | | 702/127 |
| 7,892,630 B1 * | 2/2011 | McKnight | | B32B 33/00 |
| | | | | 428/212 |
| 7,892,876 B2 * | 2/2011 | Mehregany | | G01P 15/125 |
| | | | | 438/51 |
| 8,618,894 B2 * | 12/2013 | Kim | | H01P 1/201 |
| | | | | 333/202 |
| 8,803,751 B1 * | 8/2014 | Miller | | H01Q 7/06 |
| | | | | 343/787 |
| 8,912,711 B1 * | 12/2014 | Chang | | H03H 9/19 |
| | | | | 310/367 |
| 9,211,690 B1 * | 12/2015 | McKnight | | B32B 3/14 |
| 9,250,074 B1 * | 2/2016 | Kubena | | G01C 19/5684 |
| 9,250,452 B1 * | 2/2016 | Yap | | G02B 6/4279 |
| 9,383,208 B2 * | 7/2016 | Mohanty | | H03B 5/30 |
| 9,825,610 B1 * | 11/2017 | Churchill | | H03H 9/46 |
| 9,879,997 B1 * | 1/2018 | Kubena | | G01C 19/5684 |
| 9,977,097 B1 * | 5/2018 | Nguyen | | G01R 33/0286 |
| 9,991,863 B1 * | 6/2018 | Kubena | | H03H 9/19 |
| 10,031,191 B1 * | 7/2018 | Nguyen | | G01R 33/0283 |
| 10,110,198 B1 * | 10/2018 | Kubena | | H03H 9/125 |
| 10,126,376 B1 * | 11/2018 | Nguyen | | G01R 33/0283 |
| 10,175,307 B1 * | 1/2019 | Sorenson | | G01R 33/0286 |
| 10,177,737 B1 * | 1/2019 | Kubena | | H01L 41/047 |
| 10,266,398 B1 * | 4/2019 | Kubena | | B81B 3/0078 |
| 10,308,505 B1 * | 6/2019 | Kirby | | B81B 3/00 |
| 10,389,392 B1 * | 8/2019 | Kubena | | H04B 1/0458 |
| 2002/0166379 A1 * | 11/2002 | Paros | | G01C 19/5607 |
| | | | | 73/504.12 |
| 2004/0194548 A1 * | 10/2004 | Dayagi | | C07D 339/04 |
| | | | | 73/580 |
| 2004/0263408 A1 * | 12/2004 | Sievenpiper | | H01Q 3/46 |
| | | | | 343/757 |
| 2005/0082944 A1 * | 4/2005 | Thompson | | G01N 33/54373 |
| | | | | 310/318 |
| 2005/0122115 A1 * | 6/2005 | Maguire | | G01R 33/345 |
| | | | | 324/322 |
| 2005/0174014 A1 * | 8/2005 | Korden | | H03H 9/25 |
| | | | | 310/322 |
| 2006/0160136 A1 * | 7/2006 | Xiang | | G01N 24/088 |
| | | | | 435/7.1 |
| 2007/0001773 A1 * | 1/2007 | Oxborrow | | H01P 7/10 |
| | | | | 331/154 |
| 2007/0017287 A1 * | 1/2007 | Kubena | | G01C 19/5684 |
| | | | | 73/504.02 |
| 2007/0082642 A1 * | 4/2007 | Hattori | | H03H 9/542 |
| | | | | 455/286 |
| 2007/0179781 A1 | 8/2007 | Villemoes | | |
| 2007/0180911 A1 * | 8/2007 | Shoji | | G01P 15/105 |
| | | | | 73/514.31 |
| 2007/0205849 A1 * | 9/2007 | Otis | | H03H 9/545 |
| | | | | 333/187 |
| 2007/0216406 A1 * | 9/2007 | Witcraft | | G01R 33/09 |
| | | | | 324/252 |
| 2008/0136418 A1 * | 6/2008 | Renz | | G01R 33/365 |
| | | | | 324/322 |
| 2008/0163689 A1 * | 7/2008 | Thompson | | G01N 29/036 |
| | | | | 73/590 |
| 2009/0003136 A1 * | 1/2009 | Karr | | A63B 24/0021 |
| | | | | 367/128 |
| 2009/0109048 A1 * | 4/2009 | Spivak | | H03K 17/94 |
| | | | | 340/686.6 |
| 2009/0147254 A1 * | 6/2009 | Kirby | | G01N 21/658 |
| | | | | 356/301 |
| 2010/0176809 A1 * | 7/2010 | Biber | | G01R 33/3692 |
| | | | | 324/309 |
| 2011/0062955 A1 * | 3/2011 | Miller | | H01Q 17/00 |
| | | | | 324/249 |
| 2013/0201316 A1 * | 8/2013 | Binder | | H04L 67/12 |
| | | | | 348/77 |
| 2013/0217979 A1 * | 8/2013 | Blackadar | | A61B 5/6829 |
| | | | | 600/301 |
| 2014/0111019 A1 * | 4/2014 | Roy | | G01V 3/10 |
| | | | | 307/104 |
| 2014/0113828 A1 * | 4/2014 | Gilbert | | H01L 39/225 |
| | | | | 505/100 |
| 2015/0295320 A1 * | 10/2015 | Lee | | G01R 33/34038 |
| | | | | 324/322 |
| 2015/0323694 A1 * | 11/2015 | Roy | | G01V 3/081 |
| | | | | 307/104 |
| 2015/0341201 A1 * | 11/2015 | Funada | | H04W 52/281 |
| | | | | 375/260 |
| 2016/0003924 A1 * | 1/2016 | Sun | | G01R 33/28 |
| | | | | 324/322 |
| 2016/0209478 A1 * | 7/2016 | Forstner | | G01R 33/05 |
| 2016/0211999 A1 | 7/2016 | Wild et al. | | |
| 2016/0327597 A1 * | 11/2016 | Ghionea | | G01R 29/12 |
| 2016/0380357 A1 * | 12/2016 | Keller | | H01Q 9/04 |
| | | | | 343/731 |
| 2016/0380487 A1 * | 12/2016 | Widmer | | H02J 50/12 |
| | | | | 324/654 |
| 2016/0380488 A1 * | 12/2016 | Widmer | | B60L 53/36 |
| | | | | 324/207.15 |
| 2017/0141622 A1 * | 5/2017 | Meichle | | B60L 53/38 |
| 2017/0212060 A1 * | 7/2017 | Hao | | G01N 22/00 |
| 2017/0244377 A1 * | 8/2017 | Yamane | | H01L 43/08 |
| 2017/0276848 A1 * | 9/2017 | Sinclair | | G02B 5/201 |
| 2017/0345449 A1 * | 11/2017 | Shibata | | G01R 33/1284 |
| 2018/0040666 A1 * | 2/2018 | Shibata | | H01L 43/08 |
| 2018/0057409 A1 * | 3/2018 | Rosseinsky | | C04B 35/6264 |
| 2018/0083595 A1 * | 3/2018 | Kaida | | H03H 9/132 |
| 2018/0115070 A1 * | 4/2018 | Wang | | H01Q 7/06 |
| 2018/0198211 A1 * | 7/2018 | Wall | | H01Q 9/16 |
| 2018/0226720 A1 * | 8/2018 | Wall | | H03H 7/38 |
| 2018/0248516 A1 * | 8/2018 | Noto | | H03H 9/0552 |
| 2018/0275230 A1 * | 9/2018 | Trakimas | | G01R 33/302 |
| 2018/0302032 A1 * | 10/2018 | Oya | | H03H 9/0552 |
| 2018/0323768 A1 * | 11/2018 | Ikeda | | H03H 9/13 |
| 2019/0072374 A1 * | 3/2019 | Mann | | G01B 7/24 |
| 2019/0123714 A1 * | 4/2019 | Kizu | | H03H 9/0595 |
| 2019/0245254 A1 * | 8/2019 | Yamane | | H01L 43/08 |
| 2019/0250198 A1 * | 8/2019 | Kubena | | G01R 29/0878 |

FOREIGN PATENT DOCUMENTS

| | | | | |
|---|---|---|---|---|
| EP | 0496583 A2 * | 7/1992 | | H03H 9/02023 |
| JP | 2014135647 A | 7/2014 | | |
| WO | WO-2009045576 A2 * | 4/2009 | | G01N 21/658 |
| WO | 2015024994 A1 | 2/2015 | | |
| WO | WO-2015024994 A1 * | 2/2015 | | H04L 27/2647 |
| WO | WO-2015072985 A1 * | 5/2015 | | G01R 33/3678 |

OTHER PUBLICATIONS

"F-OFDM scheme and filter design," 3GPP TSG RAN WG 1 Meeting #85, R1-165425, Nanjing, China; XP051111634, pp. 1-10, 3rd Generation Partnership Project—Valbonne, France (May 23-27, 2016).

Xin Yu et al.,"FB-OFDM: A novel Multicarrier Scheme for 5G," 2016 European Conference on Networks and Com-

(56) References Cited

OTHER PUBLICATIONS munications(EUCNC), IEEE, XP032957224, pp. 1-6, Institute of Electrical and Electronics Engineers—New York, New York (Jun. 27, 2016).
Jung et al, "The WSSUS Pulse Design Problem in Multicarrier Transmission," IEEE Transactions on Communications, pp. 1-25, Institute of Electrical and Electronics Engineers—New York, New York (Nov. 2007).
Vaidyanathan et al., "Multirate Digital Filters, Filter Banks, Polyphase Networks, and Applications: A Tutorial," Proceedings of the IEEE, vol. 78, No. 1, pp. 56-93, Institute of Electrical and Electronics Engineers—New York, New York (Jan. 1990).
Opphenheim et al.,"Discrete-Time Signal Processing," Englewood Cliffs, NJ, pp. 1-896, USA: Prentice-Hall (1989).
Farhang-Boroujeny, "OFDM Versus Filter Bank Multicarrier," IEEE Signal Processing Magazine, vol. 28, No. 3, pp. 92-112, Institute of Electrical and Electronics Engineers—New York, New York (May 2011).
Zhao et al., "Pulse shaped OFDM for asynchronous uplink access," Asilomar Conference on Signals, Systems and Computers, Monterey, USA, pp. 1.1-5, Institute of Electrical and Electronics Engineers—New York, New York (Nov. 2015).
Wild et al., "5G Air Interface Design based on Universal Filtered (UF-)OFDM," International Conference on Digital Signal Processing (DSP), Hong Kong, pp. 1-6, Institute of Electrical and Electronics Engineers—New York, New York (Aug. 2014).
Abdoli et al., "Filtered OFDM: A New Waveform for Future Wireless Systems," IEEE SPAWC 2015, Stockholm, Sweden, pp. 1-5, nstitute of Electrical and Electronics Engineers—New York, New York (Jun. 2015).
"Detailed configuration of f-OFDM and W-OFDM for LLS evaluation," 3GPP TSG RAN WG1 Meeting #86, Gothenburg, Sweden, R1-166999, total 6 pages, 3rd Generation Partnership Project, Valbonne, France (Aug. 22-26, 2016).
"Discussion on FB-OFDM of new waveform for new radio interface," 3GPP TSG RAN WG1 Meeting #85, Nanjing, P.R. China, R1-164265, total 7 pages, 3rd Generation Partnership Project, Valbonne, France (May 23-27, 2016).
JP/2019-531533, Office Action, dated Mar. 10, 2020.

\* cited by examiner

FILTERED MULTI-CARRIER COMMUNICATIONS

CROSS-REFERENCE TO RELATED APPLICATIONS

This application is a continuation of International Application No. PCT/EP2016/070463, filed on Aug. 31, 2016, the disclosure of which is hereby incorporated by reference in its entirety.

BACKGROUND

The present application, in some embodiments thereof, relates to multi-carrier 5G communication systems and, more specifically, but not exclusively, to orthogonal frequency division multiplex (OFDM) 5G communication systems.

Fifth generation wireless systems (5G) will be required to accommodate the diverse requirements raised by the large variety of different new services which will be included in 5G systems. Examples of these new services include machine type communication (MTC) and vehicular-to-anything communication (V2X). Consequently, a "one size fits all" solution for the air interface, as prevalent in today's radio systems, will no longer be adequate as it merely provides an inadequate compromise. Instead, the 5G system must provide more flexibility to enable tailoring the system configurations to the service types and their demands.

Multi-carrier waveforms with filtering may be a significant approach for such a flexible air interface, as they offer additional degrees of freedom for the system design. Multi-carrier waveforms enable partitioning the spectrum available for mobile radio transmission into independent sub-bands, which may be individually configured to optimally adapt to signal conditions of individual user links or to the requirements of a particular radio service. With good spectral containment of the signal power provided by filtered waveforms, interference between individually configured sub-bands may be kept to a minimum even if those signals are only loosely synchronized. This will allow for independent and uncoordinated operation of different services in the transmission band and enables asynchronous system design.

Orthogonal frequency division multiplex (OFDM) is a multi-carrier scheme which is implemented in several current wireless systems, such as WiFi and LTE. OFDM divides a given bandwidth B into a number of M narrow-band subcarrier signals which are used for the parallel transmission of data symbols. The subcarrier spacing amounts to F=B/M. The (up to) M data symbols transmitted in parallel are contained in an OFDM symbol of time duration T. T may cover a periodic repetition of the Inverse Discrete Fourier Transform (IDFT) transformed frequency domain signal containing the M subcarrier data signals, thus forming a cyclic prefix (CP) and yielding T>1/F. The proper dimensioning of F and T usually depends on the properties of the doubly dispersive channel. The symbol duration T is typically chosen to be large compared to the maximum delay spread, while the subcarrier spacing F is typically chosen to be large compared to the maximum Doppler spread or frequency offset.

The OFDM transmit signal s(t) and the estimate of the data symbol $\bar{a}_{mn}$ obtained from the receive signal r(t) are given by the following formulas:

$$s(t) = \sum_n \sum_{m=1}^{M} a_{mn} \cdot g_{T,m}(t - nT)$$

$$\bar{a}_{mn} = \int_{-\infty}^{\infty} r(t) \cdot g_{R,m}^*(t - nT) dt$$

where m stands for the subcarrier index, $m \in [1, \ldots, M]$, n is the OFDM symbol index in time domain, $a_{mn}$ is the data symbol conveyed on the m-th subcarrier within the n-th symbol, and $g_T$ and $g_R$ are the transmit and receive pulse shape, respectively, for the subcarrier signal at index m.

Classically, a rectangular window is used at transmitter and receiver, which shapes the subcarrier signals in frequency domain according to the sinc-pulse. The rectangular pulses at the transmitter $g_T$ and receiver $g_R$ are then given by the following formulas:

$$g_{T,m}(t) = \text{rect}_T(t) \cdot e^{j2\pi mFt}$$

$$g_{R,m}(t) = \text{rect}_{1/F}(t) \cdot e^{j2\pi mFt}$$

Note that if transmitter and receiver are properly synchronized, $g_R$ simply cuts off the cyclic prefix (CP) added at the transmitter to obtain an OFDM symbol of the minimum length of $T_{OFDM,min} = 1/F$, which is then transformed to frequency domain to obtain the data symbols on the M subcarriers.

While the choice of rectangular pulses at transmitter and receiver enables a very simple system implementation, it has the following drawbacks:
a) The mismatch of transmit and receive filter induces an SNR loss.
b) Sinc-shaped spectrum of rectangular pulse is not well localized, resulting in energy leakage.
c) Not robust against frequency distortions like carrier frequency offsets or Doppler spread.

To address the problem of the poor frequency localization of OFDM signals with rectangular pulse, pulses with smooth power roll-off in time domain may be used. This translates to a steeper power decay in the frequency domain, yielding spectrally well-contained signals. With pulse shaping, pulses may be extended beyond the symbol duration T, yielding consecutively transmitted OFDM symbols to overlap. The spectral containment typically improves for longer pulse duration, highlighting a fundamental trade-off of the pulse design in those systems. Such an OFDM system with the pulse shape of arbitrary length as an open design parameter is known as filtered multi-tone (FMT) or filterbank multi-carrier (FBMC) system.

With pulse shaping at transmitter and receiver, the transmit signal and estimated data signal at the receiver read:

$$s(t) = \sum_n \sum_{m=1}^{M} a_{mn} \cdot g_T(t - nT) \cdot e^{j2\pi mF(t - nT)}$$

$$\bar{a}_{mn} = \int_{-\infty}^{\infty} r(t) \cdot g_R^*(t - nT) \cdot e^{-j2\pi mF(t - nT)} dt$$

Hence, the corresponding pulses for transmitter and receiver are given respectively by the following formulas:

$$g_{T,m}(t) = g_T(t) \cdot e^{j2\pi mFt}$$

$$g_{R,m}(t) = g_R(t) \cdot e^{j2\pi mFt}$$

Both these filters may be either matched to each other ($g_T=g_R$) to attain the maximum SNR, or they may be chosen to be distinct to minimize the interference inherent to the system conditions expected during operation. In general, the exact filter design is the result of an optimization process fulfilling predefined design constraints, such as the minimization of interference or maximization of an SINR. Orthogonality is another important design criterion within this optimization process.

The pulse-shaping system solution has some drawbacks, including:
a) Tradeoff between orthogonality, robustness against channel distortions and out-of-band emission (OOBE).
b) The OOBE cannot be substantially reduced with the filter length constrained in time.
c) Long filter impulse response in time domain may significantly improve spectral localization, however, it usually results in pulses spanning several symbol durations T, which may pose difficulties for time framed transmissions.

An alternative approach to attain spectral containment of multi-carrier signals while maintaining the properties of classical OFDM systems (in particular its favorable time localization) is the filtered OFDM system which uses a sub-band low-pass (LP) filter to filter a group of neighboring subcarriers (denoted herein a sub-band) and thus reduce the OOBE for that sub-band. Since this approach does not entail any windowing, the subcarrier signals within one sub-band maintain their sinc-shape as in classical OFDM.

With low-pass filtering at transmitter and receiver for a sub-band width of 2Q+1 subcarriers, transmit signal and estimated data signal at the receiver read:

$$s(t) = \left( \sum_n \sum_{m=-Q}^{Q} a_{mn} \cdot rect_T(t-nT) \cdot e^{j2\pi mF(t-nT)} \right) * g_{LP}(t)$$

$$\bar{a}_{mn} = \int_{-\infty}^{\infty} (r(t) \cdot g_{LP}(t)) \cdot rect_{1/F}(t-nT) \cdot e^{-j2\pi mF(t-nT)} dt,$$

$$m \in [-Q, \ldots, Q]$$

where $g_{LP}$ represents the sub-band low-pass filter applied at transmitter and receiver, and * denotes the linear convolution. The filtered pulses at transmitter and receiver are thus respectively given by the following formulas:

$$g_{T,m}(t) = (rect_T(t) \cdot e^{j2\pi mFt}) * g_{LP}(t)$$

$$g_{R,m}(t) = (rect_{1/F}(t) \cdot e^{j2\pi mFt}) * g_{LP}(t)$$

Compared to OFDM with pulse shaping as described above, sub-band filtering has the advantage that it may achieve a steeper power decay in the frequency domain for a constrained filter length. However this comes at the price of some distortions introduced by the filtering. Hence, the drawbacks of the sub-band filtering may be summarized as follows:
a) The mismatch of transmit and receive filter induces an SNR loss (as in classical OFDM).
b) Not robust against frequency distortions like carrier frequency offsets or Doppler spread (as in classical OFDM).
c) Low-pass filter introduces additional distortions.

In summary, current OFDM system designs do not attain the performance characteristics which will be required to provide high-quality 5G services.

Additional background art includes:
[1] P. Jung and G. Wunder, "The WSSUS pulse design problem in multicarrier transmission," *IEEE Transactions on Communications*, vol. 55, no. 10, pp. 1918-1928, October 2007.
[2] A. Antoniou, *Digital Filters: Analysis, Design, and Applications*, New York, N.Y.: McGraw-Hill, 1993.
[3] P. P. Vaidyanathan, "Multirate digital filters, filter banks, polyphase networks, and applications: a tutorial," *Proceedings of the IEEE*, vol. 78, no. 1, pp. 56-93, January 1990.
[4] A. Oppenheim and R. Schafer, *Discrete-Time Signal Processing*. Englewood Cliffs, N.J., USA: Prentice-Hall, 1989.
[5] B. Farhang-Boroujeny, "OFDM Versus Filter Bank Multicarrier", IEEE Signal Processing Magazine, vol. 28, no. 3, pp. 92-112, May 2011.
[6] Z. Zhao, M. Schellmann, Q. Wang, X. Gong et al., "Pulse shaped OFDM for asynchronous uplink access", Asilomar Conference on Signals, Systems and Computers, Monterey, USA, November 2015.
[7] T. Wild, F. Schaich and Y. Chen, "5G Air Interface Design based on Universal Filtered. (UF-)OFDM", International Conference on Digital Signal Processing (DSP), Hong Kong, August 2014.
[8] J. Abdoli, M. Jia and J. Ma, "Filtered OFDM: A new waveform for future wireless systems", IEEE SPAWC 2015, Stockholm, Sweden, June 2015.

SUMMARY

Embodiments of the invention include correlated pulse-shaping and sub-band filtering of multi-carrier signals at the receiver and/or transmitter ends of a multi-carrier communication system such as OFDM. The pulse-shaped filtered multi-carrier system provides good spectral containment, high robustness to frequency distortions and minimizes signal distortions induced by the sub-band filter.

The sub-band filter and one or both pulse shaping filters may be jointly designed, optionally by an iterative design process as described in more detail below.

According to an aspect of some embodiments of the present invention there is provided an apparatus for processing data symbols in a multi-carrier transmitter. The apparatus includes a transmit pulse shaper and a transmit sub-band filter. The transmit pulse shaper filters a plurality of data pulses with respective transmit pulse shaping filters. Each of the data pulses is associated with a respective carrier. The transmit sub-band performs sub-band filtering of the pulse-shaped data pulses. The sub-band filter and at least one of the transmit pulse shaping filters are correlated.

According to some embodiments of the invention, the sub-band filter is predefined with a required sub-band bandwidth and a required sub-band filter length, and at least one of the transmit pulse shaping filters is designed, based on the predefined sub-band filter, to have a required pulse shape filter length and to maximize a signal-to-interference-plus-noise ratio (SINR).

According to some embodiments of the invention, the sub-band filter is predefined with a required sub-band bandwidth and a required sub-band filter length, and at least one of the transmit pulse shaping filters is designed, based on the predefined sub-band filter, to have a required pulse shape filter length and to optimize a specified performance measure.

According to some embodiments of the invention, at least one of the transmit pulse shaping filters is predefined with a required pulse shaping filter length, and the sub-band filter is designed, based on the at least one predefined transmit pulse shaping filter, to have a required sub-band bandwidth and sub-band filter length and to attain a specified out-of-band emission (OOBE).

According to some embodiments of the invention, at least one of the transmit pulse shaping filters is predefined with a required pulse shaping filter length, and the sub-band filter is designed, based on the at least one predefined transmit pulse shaping filter, to have a required sub-band bandwidth and sub-band filter length and to optimize a specified performance measure.

According to some embodiments of the invention, the sub-band filter and at least one of the transmit pulse shaping filters are jointly designed to optimize a specified performance measure.

According to some embodiments of the invention, the carriers include sub-carriers in an OFDM sub-band.

According to some embodiments of the invention, the sub-band filter is a low-pass filter.

According to some embodiments of the invention, the apparatus for processing data symbols in a multi-carrier transmitter further includes a modulator adapted to modulate input data onto the carriers.

According to some embodiments of the invention, the apparatus for processing data symbols in a multi-carrier transmitter further includes an inverse frequency transformer, adapted to transform a plurality of data-modulated carriers to the plurality of data pulses.

According to some embodiments of the invention, the apparatus for processing data symbols in a multi-carrier transmitter further includes an upconverter, adapted to upconvert the sub-band filtered data pulses to an OFDM frequency band.

According to an aspect of some embodiments of the present invention there is provided an apparatus for processing a data signal in a multi-carrier receiver. The apparatus includes a receive sub-band filter and a receive pulse shaper. The receive sub-band filter filters a received signal. The receive pulse shaper pulse-shapes carriers in the sub-band filtered signal with respective receive pulse shaping filters. The sub-band filter and at least one of the receive pulse shaping filters are correlated.

According to some embodiments of the invention, the sub-band filter is predefined with a required sub-band bandwidth and a required sub-band filter length, and at least one of the receive pulse shaping filters is designed, based on the predefined sub-band filter, to have a required pulse shape filter length and to maximize a signal-to-interference-plus-noise ratio (SINR).

According to some embodiments of the invention, the sub-band filter is predefined with a required sub-band bandwidth and a required sub-band filter length, and at least one of the receive pulse shaping filters is designed, based on the predefined sub-band filter, to have a required pulse shape filter length and to optimize a specified performance measure.

According to some embodiments of the invention, at least one of the receive pulse shaping filters is predefined with a required pulse shaping filter length, and the sub-band filter is designed, based on the at least one predefined receive pulse shaping filter, to have a required sub-band bandwidth and sub-band filter length and to attain a specified out-of-band emission (OOBE).

According to some embodiments of the invention, at least one of the receive pulse shaping filters is predefined with a required pulse shaping filter length, and the sub-band filter is designed, based on the at least one predefined receive pulse shaping filter, to have a required sub-band bandwidth and sub-band filter length and to optimize a specified performance measure.

According to some embodiments of the invention, the sub-band filter and at least one of the receive pulse shaping filters are jointly designed to optimize a specified performance measure.

According to some embodiments of the invention, the receive sub-band filter is a low-pass filter.

According to some embodiments of the invention, the apparatus for processing a data signal in a multi-carrier receiver further includes a digital signal processor adapted to detect respective data modulated onto the carriers.

According to some embodiments of the invention, the apparatus for processing a data signal in a multi-carrier receiver further includes a downconverter adapted to obtain the received signal by downconverting an OFDM signal.

According to an aspect of some embodiments of the present invention there is provided method of filter design for a multi-carrier communication system. The method is implemented using an electronic design automation system. The method includes:
  specifying a required sub-band bandwidth, a required sub-band filter length and a required pulse shaping filter length; and
  jointly designing a sub-band filter having the required sub-band bandwidth and sub-band filter length and a receive and transmit pulse shaping filter pair, at least one of the receive pulse shaping filter and the transmit pulse shaping filter having the required pulse shaping filter length.

According to some embodiments of the invention, jointly designing the sub-band filter and the receive and transmit pulse shaping filter pair includes designing both of the receive pulse shaping filter and the transmit pulse shaping filter to have the required pulse shaping filter length.

According to some embodiments of the invention, the receive pulse shaping filter and the transmit pulse shaping filter are matched.

According to some embodiments of the invention, jointly designing the sub-band filter and the receive and transmit pulse shaping filter pair includes designing both of the receive pulse shaping filter and the transmit pulse shaping filter to have different respective pulse shaping filter lengths.

According to some embodiments of the invention, jointly designing the sub-band filter and the receive and transmit pulse shaping filter pair includes:
  predefining a sub-band filter having the required sub-band bandwidth and sub-band filter length; and
  designing the receive and transmit pulse shaping filter pair, based on the predefined sub-band filter, to obtain the required pulse shaping filter length for the at least one of the receive pulse shaping filter and the transmit pulse shaping filter and to maximize a signal-to-interference-plus-noise ratio (SINR).

According to some embodiments of the invention, jointly designing the sub-band filter and the receive and transmit pulse shaping filter pair includes:
  predefining a sub-band filter having the required sub-band bandwidth and sub-band filter length; and
  designing the receive and transmit pulse shaping filter pair, based on the predefined sub-band filter, to obtain the required pulse shaping filter length for the at least one of the receive pulse shaping filter and the transmit pulse shaping filter and to optimize a specified performance measure.

According to some embodiments of the invention, jointly designing the sub-band filter and the receive and transmit pulse shaping filter pair includes:
  predefining a receive and transmit pulse shaping filter pair, at least one of the receive pulse shaping filter and the transmit pulse shaping filter having the required pulse shaping filter length; and
  designing the sub-band filter, based on the predefined receive and transmit pulse shaping filter pair, to obtain a required sub-band bandwidth and sub-band filter length and to attain a specified out-of-band emission (OOBE).

According to some embodiments of the invention, jointly designing the sub-band filter and the receive and transmit pulse shaping filter pair includes:
  predefining a receive and transmit pulse shaping filter pair, at least one of the receive pulse shaping filter and the transmit pulse shaping filter having the required pulse shaping filter length; and
  designing the sub-band filter, based on the predefined receive and transmit pulse shaping filter pair, to obtain a required sub-band bandwidth and sub-band filter length and to optimize a specified performance measure.

According to some embodiments of the invention, the sub-band filter and the receive and transmit pulse shaping filter pair are jointly designed to optimize a specified performance measure.

According to some embodiments of the invention, the method further includes:
iteratively designing the sub-band filter and the pulse shaping filter pair by:
  based on a current design for the sub-band filter, redesigning the receive and transmit pulse shaping filters to fulfill the required pulse shape filter length and to optimize a first performance measure; and
  based on a current design for the pulse shaping filter pair, redesigning the sub-band filter to have the required sub-band bandwidth and sub-band filter length and to optimize a second performance measure; and
  outputting the designs for the sub-band filter and for the receive and transmit pulse shaping filter pair when the filter designs converge.

According to some embodiments of the invention, the method further includes, during the iterative designing, adjusting the pulse shaping filter length to increase a signal-to-interference-plus-noise ratio (SINR) attained with the filter designs.

According to some embodiments of the invention, the method further includes, during the iterative designing, adjusting at least one of carrier spacing and symbol time duration to increase an SINR attained with the filter designs.

According to some embodiments of the invention, the method further includes: when the filter designs fail to converge, adjusting communication system parameters and resuming the iterative designing.

According to some embodiments of the invention, the first performance measure comprises an SINR level and the second performance measure comprises an OOBE level.

According to some embodiments of the invention, the multi-carrier communication system comprises an OFDM communication system.

Unless otherwise defined, all technical and/or scientific terms used herein have the same meaning as commonly understood by one of ordinary skill in the art to which the application pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
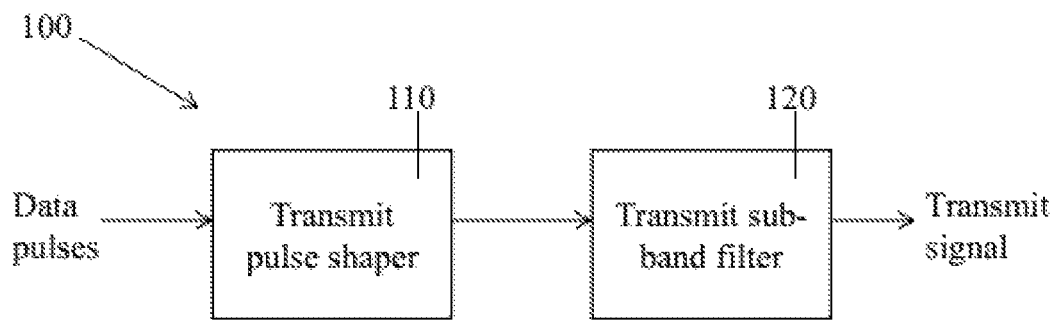
FIG. 1 is a simplified block diagram of an apparatus for processing data symbols in a multi-carrier transmitter, according to embodiments of the invention.

The present application, in some embodiments thereof, relates to multi-carrier 5G communication systems and, more specifically, but not exclusively, to orthogonal frequency division multiplex (OFDM) 5G communication systems.

Embodiments of the invention apply pulse-shaping and sub-band filtering in multi-carrier communications. This approach is presented in the following equations which show pulse shaping and sub-band filtering at the transmitter and receiver respectively:

$$g_{T,n}(t) = (g_T(t) \cdot e^{j2\pi nFt}) * g_{LP}(t)$$

$$g_{R,n}(t) = (g_R(t) \cdot e^{j2\pi nFt}) * g_{LP}(t)$$

where $g_T$ and $g_R$ are the transmit and receive pulse shapes and $g_{LP}$ represents the sub-band filter.

For clarity, some embodiments presented herein describe non-limiting implementations of sub-band filtering at baseband using a low-pass sub-band filter $g_{LP}(t)$. The low-pass filtered signal may then be shifted to the desired sub-band.

In alternate embodiments, the sub-band filtering is performed at a different frequency band (i.e. not baseband) and the sub-band filter is implemented as a bandpass filter.

Optionally, the pulse-shaped multi-carrier signal is generated in the desired sub-band and filtered with a sub-band filter at the sub-band frequency range.

With these filtered pulse shapes, the transmit signal and estimated data signal at the receiver for the pulse-shaped and sub-band filtered multi-carrier signal are:

$$s(t) = \left( \sum_n \sum_{m=-Q}^{Q} a_{mn} \cdot g_T(t-nT) \cdot e^{j2\pi mF(t-nT)} \right) * g_{LP}(t)$$

$$\bar{a}_{mn} = \int_{-\infty}^{\infty} (r(t) \cdot g_{LP}(t)) \cdot g_R^*(t-nT) \cdot e^{-j2\pi mF(t-nT)} dt,$$

$$m \epsilon [-Q, \ldots, Q]$$

Optionally, sub-band filter gLP(t) and one or both of the pulse shaping filters, gT(t) and gR(t) are designed jointly, as described in more detail below. By jointly designing the filters it is possible to optimize the robustness of the system against signal distortions while conveniently fulfilling a good spectral containment of the filtered sub-band signals.

Optionally, the joint design process is performed in an iterative manner. For example, the pair of pulse shape filters gT and gR may be designed for a desired robustness against signal distortions, subject to a fixed sub-band filter gLP. Afterwards the sub-band filter is optimized subject to the designed pair of pulse shape filters. In the subsequent iteration, the pair of pulse shape filters gT and gR is redesigned subject to the sub-band filter. This process may be reiterated until convergence is reached.

Different performance measures may be used for optimizing the filter designs. For example, the SINR (signal to noise and interference ratio) may be considered a good measure to use as an objective function for the optimization of the pulse shaping filter(s), since it reflects signal distortions caused by the system design in an expected operational environment together with the degradation due to noise. For the design of the sub-band filter, however, the OOBE may be the preferred performance measure since the suppression of the signals' side-low lobes, and thus their spectral containment, is of significant interest here.

Before explaining at least one embodiment of the invention in detail, it is to be understood that the application is not necessarily limited in its application to the details of construction and the arrangement of the components and/or methods set forth in the following description and/or illustrated in the drawings and/or the Examples. The application is capable of other embodiments or of being practiced or carried out in various ways.

The present application may be a system, a method, and/or a computer program product. The computer program product may include a computer readable storage medium (or media) having computer readable program instructions thereon for causing a processor to carry out aspects of the present application.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present application may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present application.

Aspects of the present application are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Transmit Apparatus

Reference is now made to FIG. 1 which is a simplified block diagram of an apparatus for processing data symbols in a multi-carrier transmitter, according to embodiments of the invention. Transmit apparatus 100 includes transmit pulse shaper 110 and transmit sub-band filter 120. Optionally, the transmit apparatus is part of an OFDM communication system and the carriers are sub-carriers in an OFDM sub-band.

Transmit pulse shaper 110 filters data pulses with respective transmit pulse shaping filters. Each of the data pulses is associated with a respective carrier of the multi-carrier signal. Optionally, transmit pulse shaper 110 performs additional operations, including but not limited to: addition of a CP and/or an 'overlap and add' process (which is applied for the case that successive OFDM transmit symbols will overlap to some extent).

Transmit sub-band filter 120 performs sub-band filtering of the pulse-shaped data pulses output by transmit pulse shaper 110.

The sub-band filter and at least one of the transmit pulse shaping filters are correlated. Optionally, this correlation is obtained by a joint design process as described in more detail below.

In some embodiments, the sub-band filter is realized in the time domain. In alternate embodiments the sub-band filter is realized in the frequency domain. Optionally, the transmit sub-band filter is a low-pass filter.

Optional embodiments obtain the correlation between the sub-band filter and the transmit pulse shaping filter (or filters) in different ways. These ways include but are not limited to:

A) The sub-band filter is predefined with a required sub-band bandwidth and a required sub-band filter length. At least one of the transmit pulse shaping filters is designed, based on the predefined sub-band filter, to have a required pulse shape filter length and to optimize at least one specified performance measure. Further optionally, optimizing the specified performance measure includes maximizing a signal-to-interference-plus-noise ratio (SINR).

B) At least one of the transmit pulse shaping filters is predefined with a respective required pulse shaping filter length. The sub-band filter is designed, based on the predefined transmit pulse shaping filter(s), to have a required sub-band bandwidth and sub-band filter length and to optimize at least one specified performance measure. Further optionally, optimizing the specified performance measure includes attaining a specified out-of-band emission (OOBE).

C) The sub-band filter and one or more of the transmit pulse shaping filters are jointly designed to optimize a specified performance measure.

As used herein, the term "specified performance measure" means one or more parameters related to the characteristics of the signal itself (transmitted and/or received) and/or of the communication system (transmitting and/or receiving ends).

The term "optimize" means to change design parameters so as to improve a level of a performance measure relative to a desired level (e.g. design goal). The optimization is typically constrained to given system conditions.

Optionally, pulse shaping is implemented by parallel polyphase filtering and sub-band filtering is implemented by fast convolution, typically leading to low implementation costs.

In an alternate optional implementation, an extended FFT spans the entire length of the pulse shaped filtered OFDM symbol including all its filter tails. In this case, all filtering operations (pulse shaping and sub-band filtering) may be implemented in the frequency domain.

In both cases, the receiver may be realized in a corresponding manner.

Transmit apparatus 100 optionally includes one or more additional elements including but not limited to:

A) A modulator which modulates input data onto the carriers (e.g. onto the OFDM sub-carriers).

B) An inverse frequency transformer (IFFT) which transforms data-modulated carriers to time-domain data pulses for input to transmit pulse shaper 110. Further optionally, a large-sized IFFT is used to enable efficient transformation of an oversampled frequency-domain signal (e.g. using integer oversampling factor and increasing the IFFT block by an integer factor accordingly).

C) An upconverter which upconverts the sub-band filtered data pulses to an OFDM frequency band. Optionally, further signal processing is applied to the output of transmit sub-band filter 120 before upconversion.

Figure 2:
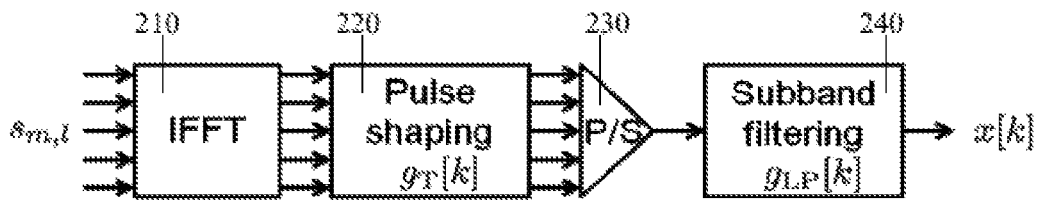
FIG. 2 is a simplified block diagram of an apparatus for processing data symbols in a multi-carrier transmitter according to an exemplary embodiment of the invention.

Reference is now made to FIG. 2, which is a simplified block diagram of an apparatus for processing data symbols in a multi-carrier transmitter, according to an exemplary embodiment of the invention.

Data modulated carriers sm,1 on the subcarriers in the frequency domain are added up by inverse Fourier transformer (IFFT) 210. They then undergo pulse shaping 220 and sub-band filtering 240.

The pulse shaping operation is applied on the time-domain OFDM data symbol generated by IFFT 210. In the exemplary embodiment of FIG. 2, the sub-band filtering is applied to concatenated pulse-shaped OFDM data symbols after parallel to serial conversion by P/S 230.

Optionally, the pulse shaping includes possible addition of a CP and/or the 'overlap and add' process, which is applied for the case that successive OFDM transmit symbols will be overlapping to some extent.

Receive Apparatus

Figure 3:
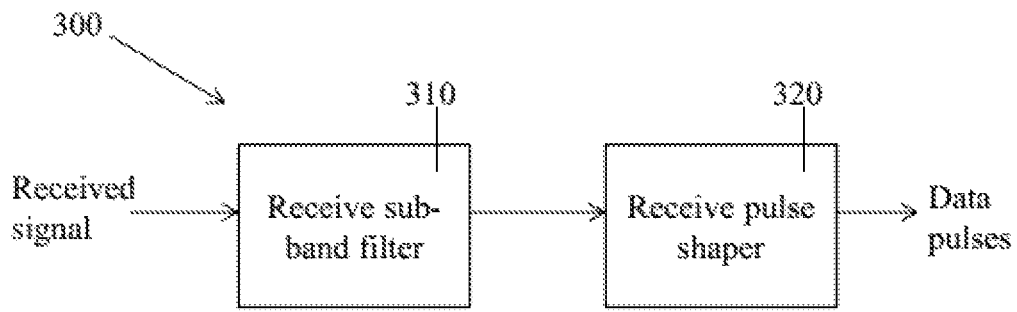
FIG. 3 is a simplified block diagram of an apparatus for processing data symbols in a multi-carrier receiver, according to embodiments of the invention.

Reference is now made to FIG. 3 which is a simplified block diagram of an apparatus for processing data symbols in a multi-carrier receiver, according to embodiments of the invention. Receive apparatus 300 includes receive sub-band filter 310 and receive pulse shaper 320. Optionally, the receive apparatus is part of an OFDM communication system and the carriers are sub-carriers in an OFDM sub-band.

Receive sub-band filter 310 filters a received signal. Receive pulse shaper 320 filters the pulse-shaped carriers in the sub-band filtered signal with respective receive pulse shaping filters.

The sub-band filter and at least one of the receive pulse shaping filters are correlated. Optionally, this correlation is obtained by a joint design process similar to the process described above for the transmit apparatus. These ways include but are not limited to:

A) The sub-band filter is predefined with a required sub-band bandwidth and a required sub-band filter length. At least one of the receive pulse shaping filters is designed, based on the predefined sub-band filter, to have a required pulse shape filter length and to optimize at least one specified performance measure. Further optionally, optimizing the specified performance measure includes maximizing a signal-to-interference-plus-noise ratio (SINR).

B) At least one of the receive pulse shaping filters is predefined with a required pulse shaping filter length. The sub-band filter is designed, based on the predefined receive pulse shaping filter(s), to have a required sub-band bandwidth and sub-band filter length and to optimize at least one specified performance measure. Further optionally, optimizing the specified performance measure includes attaining a specified out-of-band emission (OOBE).

C) The sub-band filter and one or more of the receive pulse shaping filters are jointly designed to optimize a specified performance measure.

Receive apparatus 300 optionally includes one or more additional elements including but not limited to:

A) A digital signal processor to detect respective data modulated onto the carriers.

B) A downconverter adapted to obtain the received signal by downconverting an OFDM signal.

Joint Design of Sub-Band and Pulse Shaping Filters

In some embodiments, in order attain maximum benefit from the properties provided by both approaches the pulse shape filter(s) and the sub-band filter are jointly designed. Thus, one may achieve an optimum robustness of the system against signal distortions while conveniently fulfilling a good spectral containment of the low-pass filtered sub-band signals. Optionally, the joint design is performed in an iterative manner (for example the first the pair of pulse shape filters $g_T$ and $g_R$ is optimized with respect to a desired robustness against signal distortions, subject to a fixed sub-band filter $g_{LP}$, and afterwards the sub-band filter is optimized subject to this pair of pulse shape filters). Optionally, this process is reiterated until convergence is reached.

Figure 4:
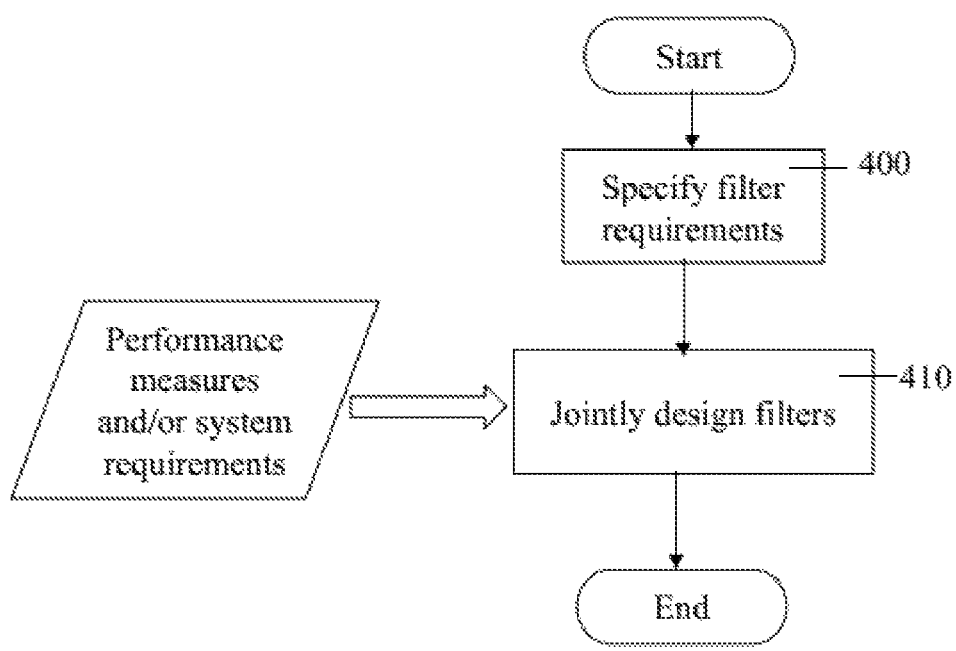
FIG. 4 is a simplified flowchart of a method of filter design for a multi-carrier communication system, according to embodiments of the invention.

Reference is now made to FIG. 4, which is a simplified flowchart of a method of filter design for a multi-carrier communication system, according to embodiments of the invention. Optionally the filter design method is performed using an electronic design automation system.

In 400, requirements for the sub-band filter and the pulse shape filters are specified. Optionally these requirements include:

a) A required sub-band bandwidth for the sub-band filter;
b) A required sub-band filter length for the sub-band filter; and
c) A required pulse shaping filter length for one or both of the receive and transmit pulse shaping filter.

In 410, a sub-band filter having the required sub-band bandwidth and sub-band filter length and a receive and transmit pulse shaping filter pair having the required pulse shaping filter length are jointly designed.

The term "receive and transmit pulse shaping filter pair" includes the receive pulse shaping filter and the transmit pulse shaping filter. Optionally, the receive and transmit pulse shaping filters are matched and both have the same filter length. Alternatively, the receive and transmit pulse shaping filters are not matched and respective filter lengths are specified for the two filters.

Optionally, the joint design starts by predefining either the sub-band filter or the receive and transmit pulse shaping filter pair. Then the other filter(s) are designed based on the predefined filter(s).

Optionally, the sub-band filter and the receive and transmit pulse shaping filter pair are jointly designed to optimize a specified performance measure.

Optionally, the sub-band filter and the pulse shaping filters are iteratively designed. Further optionally, the most recently designed type of filter is used as the basis for redesigning the other type of filter. For example, after the sub-band filter is designed (or redesigned) the pulse shaping filter pair is redesigned based on the current sub-band filter design. Then the sub-band filter is redesigned based on the current pulse shaping filter pair design.

The designs for the sub-band filter and the receive and transmit pulse shaping filter pair are output when the filter designs converge.

Optionally, the iterations begin with a predefined sub-band filter. Alternatively, the iterations begin with at least one predefined pulse shaping filter (i.e. receive and/or transmit).

The sub-band filter and pulse shaping filter pair may be predefined and/or designed by any means known in the art.

Optionally, when the filter designs fail to converge and/or do not attain the desired target performance, communication system requirements and/or performance measures and/or filter requirements are changed, and the iterative design process is resumed. The adjustment of measures and requirements may be performed until convergence is ultimately achieved.

Optional embodiments of the filter design process include one or both of:

1) Use of different sub-band filters at transmitter and receiver; and
2) Scaling of each subcarrier (i.e. multiplication of each subcarrier signal with an appropriate scaling factor) at transmitter and receiver to compensate for distortions introduced by the sub-band filters.

Figure 5:
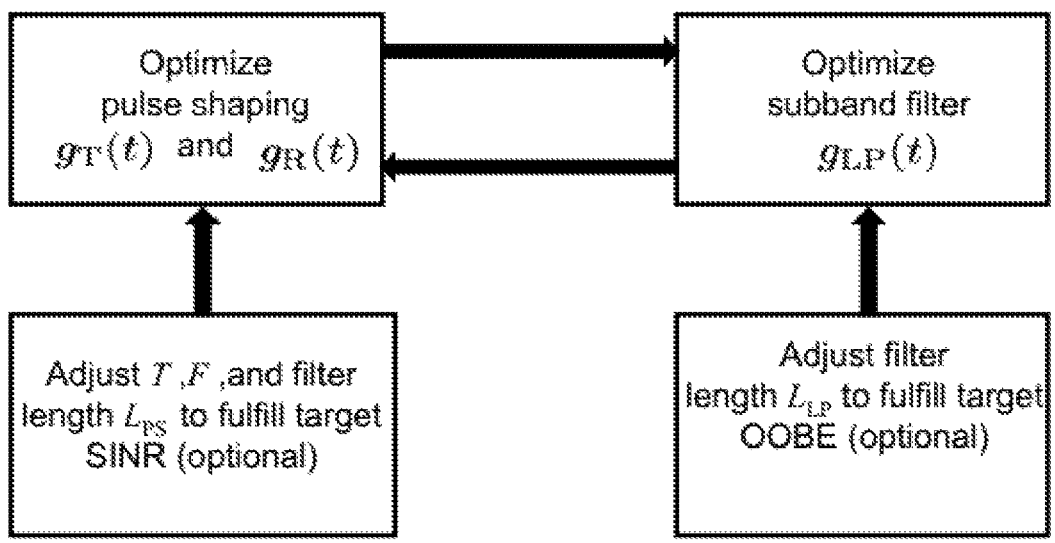
FIG. 5 illustrates the joint design of a sub-band filter and receive and transmit pulse shaping filters.
Figure 6:
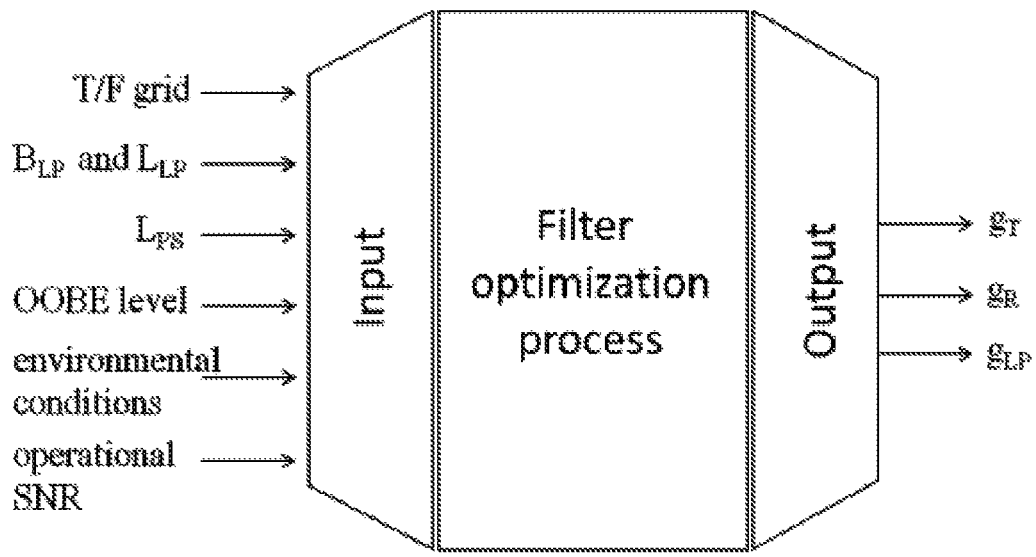
FIG. 6 shows corresponding input and output relations for the exemplary design process of FIG. 5.

Reference is now made to FIG. 5 which illustrates the joint design of a sub-band filter and receive and transmit pulse shaping filters according to an exemplary embodiment of the method. The corresponding input and output relations for the exemplary process of FIG. 5 are depicted in FIG. 6.

For the proper dimensioning of the system, first the fundamental filter requirements are specified. These filter requirements are the symbol duration T, the subcarrier spacing F and the filter length LPS for the pulse shaping filters, as well as the filter length LLP for the sub-band low-pass filter. The parameters T, F and LPS affect the design of the pulse shape filters and are usually deduced from the general system requirements and the signal conditions expected in the scenarios of operation (e.g. channel conditions or impaired synchronization).

It is noted that the filter length may be different for the filter used at transmitter and at the receiver if a matched filter design is not targeted. Opposed to that, the design of the sub-band filters is typically solely dependent on the parameter LLP, which may be chosen based on the desired suppression level of the OOBE (i.e. the spectral containment).

For optimization of the pulse shape filters, the SINR is typically a good performance measure since it reflects signal distortions caused by the system design in an expected operational environment together with the degradation due to noise. For the optimization of the sub-band filter design, the performance measure used is the OOBE since the suppression of the signals' side-low lobes and thus their spectral containment is of significant interest.

Based on these requirements and performance measures, the joint optimization process for the filters is conducted, as follows:
1. Start with a pre-defined sub-band filter $g_{LP}$ of a given bandwidth $B_{LP}$ fulfilling the length constraint $L_{LP}$.
2. Optimize the pair of pulse shapes $g_T$ and $g_R$ fulfilling the filter length constraint $L_{PS}$ with the objective of maximizing the overall SINR, subject to:
   a. The sub-band filter $g_{LP}$;
   b. Environmental conditions, like the channel statistics represented by the channel scattering functions; and
   c. Operational SNR.
3. Optimize the sub-band filter $g_{LP}$ of bandwidth $B_{LP}$ fulfilling the length constraint $L_{LP}$ with the objective of attaining the desired OOBE level, subject to:
   a. The pair of pulse shaping filters obtained in step 2.
4. With the new sub-band filter, $g_{LP}$, return to step 2, and reiterate the optimization process until convergence of the filters is attained.

Alternately, the joint optimization process is started with a predefined pair of pulse shape filters $g_T$ and $g_R$. In this case the sub-band filter $g_{LP}$ would be optimized in step 2, and the pulse shape filters would be updated in step 3.

For optimization of the pulse shape filters, approaches like the one in [1] may be applied to perform an alternating optimization of the transmit and receive filters in order to maximize the SINR for given channel statistics. This may be extended to the pulse-shaped filtered multi-carrier systems described herein by applying the additional sub-band filters to the pulse shaping filter that is kept fixed in each step. For the optimization of the sub-band filter, standard filter design tools may be used, such as equiripple filters or Dolph-Chebycheff windowing 0.

Optionally, if a desired target SINR cannot be met after completion of the optimization process, one or more of the fundamental system parameters T, F, LPS and LLP may be adjusted to improve the overall SINR conditions and then the iterative optimization process may be rerun.

Examples of Signal Features of Pulse-Shaped Filtered OFDM

FIGS. 7A-9B are graphs which illustrate improved signal features of pulse-shaped filtered OFDM relative to classical OFDM, for 25% CP overhead, SNR=10 dB and 24 subcarriers constituting a sub-band.

The pulse shapes and low-pass sub-band filter were numerically designed based on the above described method, and then the power spectral density and SINR were analyzed numerically.

Figure 7A:
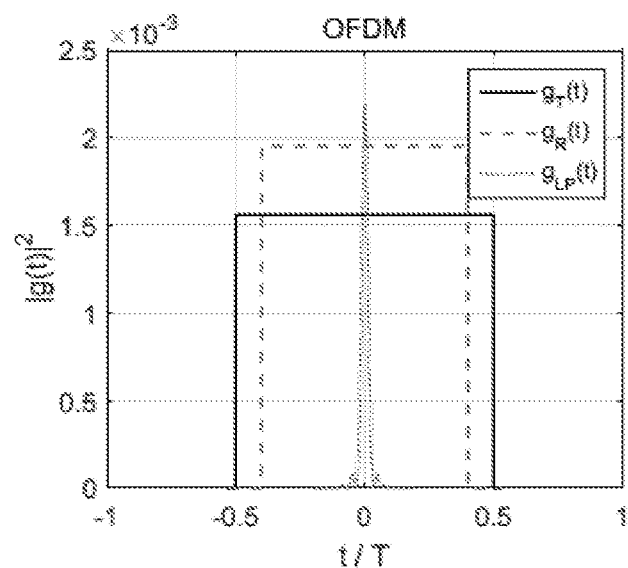
FIGS. 7A and 7B compare time domain pulse shapes in classical OFDM to pulse-shaped filtered OFDM.
Figure 7B:
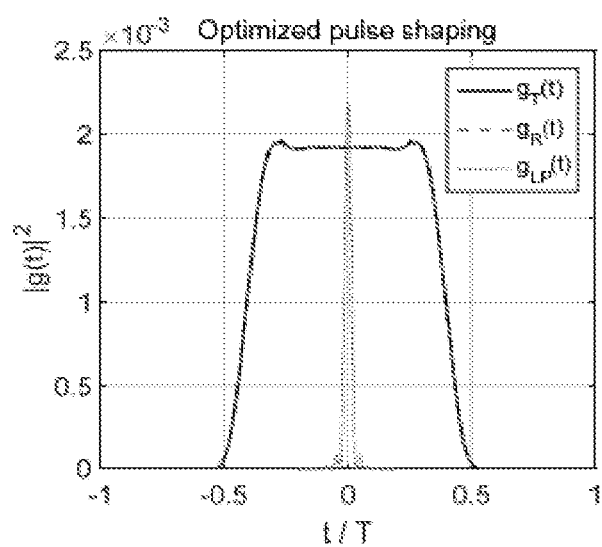

Reference is now made to FIGS. 7A and 7B which show a comparison of time domain pulse shapes used at transmitter and receiver in classical OFDM (with rectangular pulse shapes) and for pulse shaped filtered OFDM (with optimized pulse shape filters) which show:
Optimized transmit/receive filters are matched in contrast to OFDM.
Sub-band filter is very well localized in time.

Figure 8A:
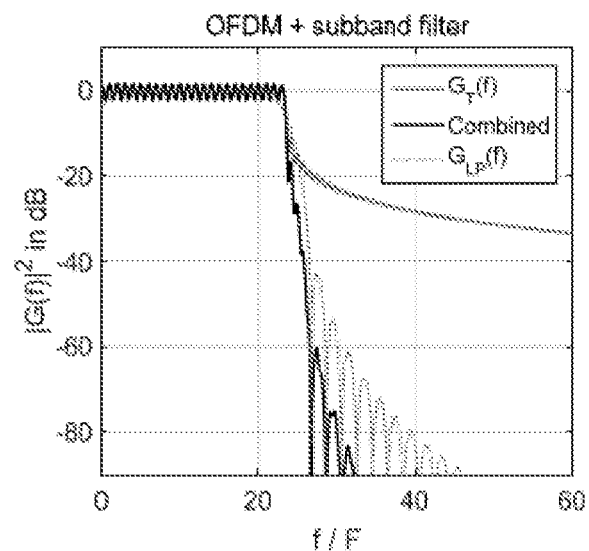
FIGS. 8A and 8B compare OOBE in OFDM with sub-band filtering to pulse-shaped filtered OFDM.
Figure 8B:
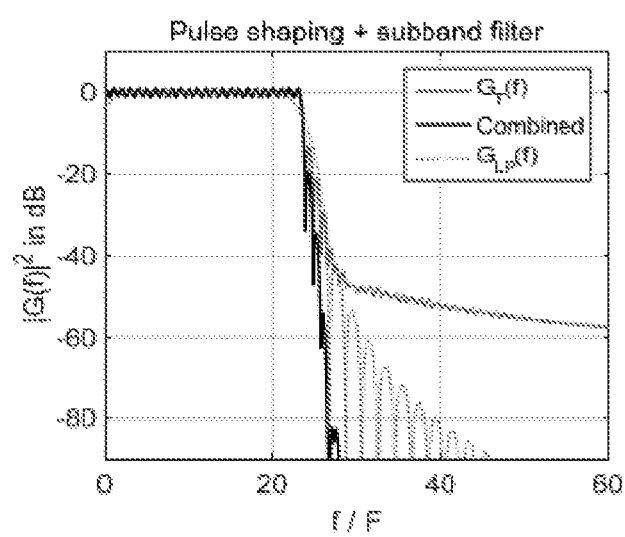

Reference is now made to FIGS. 8A and 8B which show very low OOBE for pulse-shaped filtered OFDM:
OFDM with sub-band filtering is slightly worse due to the rectangular pulse shape.
OFDM or pulse shaping alone is significantly worse.

Figure 9A:
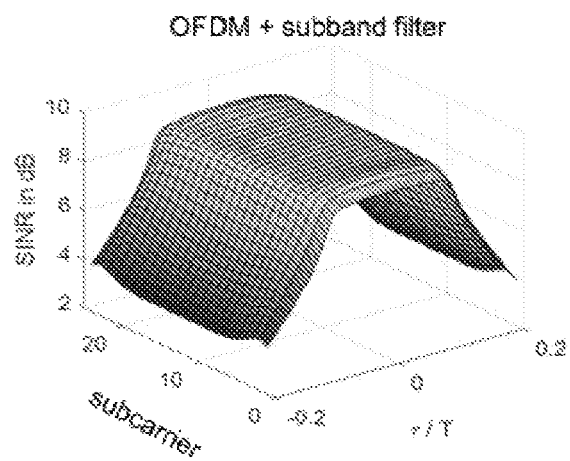
FIGS. 9A and 9B compare SINR in OFDM with sub-band filtering to pulse-shaped filtered OFDM.
Figure 9B:
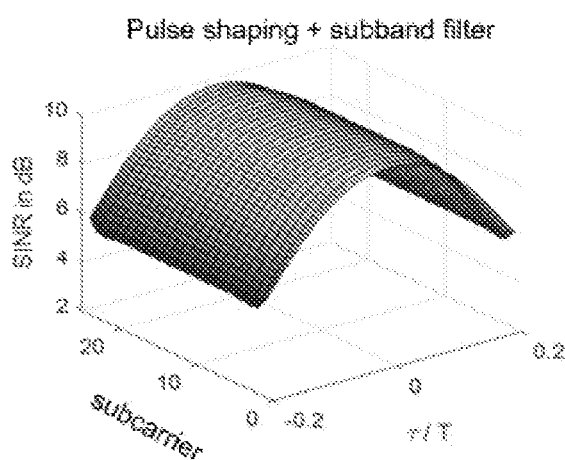

Reference is now made to FIGS. 9A and 9B which show improved SINR for pulse-shaped filtered OFDM:
Up to 1 dB gain for delays within CP (similar for frequency offsets).
Pulse shaping significantly reduces distortions at sub-band edges.

In summary, embodiments of the invention demonstrate significant advantages when compared to filtered OFDM and FMT/FBMC. Advantages of pulse-shaped filtered OFDM as compared to standard filtered OFDM include:
Higher SINR may be obtained due to matched transmit/receive filters.
Better robustness against doubly-dispersive channels.
Better robustness against distortions introduced by sub-band filter.
Advantages compared to FMT/FBMC include:
Lower out-of-band emission (OOBE).
Simplified filter design by treating SINR and OOBE separately.
Shorter filter impulse response for given ODOBE mask.
All algorithms developed for OFDM may be directly applied to pulse-shaped filtered OFDM, since OFDM compatibility is fully maintained. Such algorithms include but are not limited to, synchronization and channel estimation and MIMO detection and precoding (including space-time codes).

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant multi-carrier signals, sub-band filters, pulse shaping filters, methods of designing filters, performance measures for filter design, system requirements, receivers and transmitters will be developed and the scope of the term multi-carrier signal, multi-carrier system, sub-band filter, pulse shaping filter, method of filter design, performance measure, system requirement, receiver apparatus and transmitter apparatus is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the application. Accordingly, the description of a range should be considered to have disclosed all the possible subranges as well as individual numerical values within that range. For example, description of a range such as from 1 to 6 should be considered to have disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the application, which are, for clarity, described in the context of separate embodiments, may also be provided in combination in a single embodiment. Conversely, various features of the application, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the application has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was indicated to be incorporated herein by reference. In addition, citation or identification of any reference in this application shall not be construed as an admission that such reference is available as prior art to the present application. To the extent that section headings are used, they should not be construed as necessarily limiting.

What is claimed is:

1. An apparatus for processing data symbols in a multi-carrier transmitter, comprising: a transmit pulse shaper, configured to filter a plurality of data pulses with respective transmit pulse shaping filters, each of said data pulses being associated with a respective carrier; and a transmit sub-band filter associated with the transmit pulse shaper, configured to perform sub-band filtering of the pulse-shaped data pulses, wherein in the sub-band filter and at east one of the transmit pulse shaping filters are correlated, wherein the sub-band filter is predefined with a required sub-band bandwidth and a required sub-band filter length, and wherein at least one of said transmit pulse shaping filters is designed, based on the predefined sub-band filter, to have a required pulse shaping filter length and to optimize a specified performance measure; wherein at least one of the transmit pulse shaping filters is predefined with a required pulse shaping filter length, and wherein the sub-band filter is designed, based on the at least one predefined transmit pulse shaping filter, to have a required sub-band bandwidth and sub-band filter length and to optimize a specified performance measure, and wherein the sub-band filter having the required sub-band bandwidth and sub-band filter length and a receive and transmit pulse shaping filter pair having the required pulse shaping filter length are jointly designed.

2. The apparatus according to claim 1, wherein the sub-band filter and the at least one of the transmit pulse shaping filters are jointly designed to optimize a specified performance measure.

3. An apparatus for processing a data signal in a multi-carrier receiver, comprising: a receive sub-band filter, configured to sub-band filter a received signal; and a receive pulse shaper associated with said receive sub-band filter, configured to pulse-shape carriers in the sub-band filtered signal with respective receive pulse shaping filters, wherein the sub-band filter and at least one of the receive pulse shaping filters are correlated, wherein the sub-band filter is predefined with a required sub-band bandwidth and a required sub-band filter length, and wherein at least one of the receive pulse shaping filters is designed, based on the predefined sub-band filter, to have a required pulse shaping filter length and to optimize a specified performance measure; wherein at least one of the receive pulse shaping filters is predefined with a required pulse shaping filter length, and wherein the sub-band filter is designed, based on the at least one predefined receive pulse shaping filter, to have a required sub-band bandwidth and sub-band filter length and to optimize a specified performance measure; and wherein the sub-band filter having the required sub-band bandwidth and sub-band filter length and a receive and transmit pulse shaping filter pair having the required pulse shaping filter length are jointly designed.

4. The apparatus according to claim 3, wherein the sub-band filter and the at least one of the receive pulse shaping filters are jointly designed to optimize a specified performance measure.

5. A method of filter design for a multi-carrier communication system, comprising: using an electronic design automation system; specifying a required sub-band bandwidth, a required sub-band filter length and a required pulse shaping filter length; jointly designing a sub-band filter having the required sub-band bandwidth and the required sub-band filter length and a receive and transmit pulse shaping filter pair, at least one of the receive pulse shaping filter and the transmit pulse shaping filter having the required pulse shaping filter length; iteratively designing the sub-band filter and the pulse shaping filter pair by: based on a current design for said sub-band filter, redesigning the receive and transmit pulse shaping filters to fulfill the required pulse shaping filter length and to optimize a first performance measure; and based on a current design for the pulse shaping filter pair, redesigning the sub-band filter to have the required sub-band bandwidth and sub-band filter length and to optimize a second performance measure; and outputting the designs for the sub-band filter and for the receive and transmit pulse shaping filter pair when the filter designs converge.

6. The method according to claim 5, wherein the jointly designing comprises designing both of the receive pulse shaping filter and the transmit pulse shaping filter to have the required pulse shaping filter length.

7. The method according to claim 5, wherein the jointly designing comprises:
predefining a sub-band filter having the required sub-band bandwidth and sub-band filter length; and
designing the receive and transmit pulse shaping filter pair, based on the predefined sub-band filter, to obtain the required pulse shaping filter length for the at least one of the receive pulse shaping filter and the transmit pulse shaping filter and to optimize a specified performance measure.

8. The method according to claim 5, wherein the jointly designing comprises:
predefining the receive and transmit pulse shaping filter pair, at least one of the receive pulse shaping filter and the transmit pulse shaping filter having the required pulse shaping filter length; and
designing the sub-band filter, based on the predefined receive and transmit pulse shaping filter pair, to obtain the required sub-band bandwidth and the required sub-band filter length and to optimize a specified performance measure.

9. The method according to claim 5, wherein the sub-band filter and the receive and transmit pulse shaping filter pair are jointly designed to optimize a specified performance measure.

10. The method according to claim 5, further comprising:
when the filter designs fail to converge, adjusting communication system parameters and resuming the iterative designing.

11. A non-transitory computer readable storage medium, comprising a computer readable program instruction, wherein when the computer readable program instruction is executed by a processor, the processor is configured for: using an electronic design automation system: specifying a required sub-band bandwidth, a required sub-band filter length and a required pulse shaping filter length; jointly designing a sub-band filter having the required sub-band bandwidth and the required sub-band filter length and a receive and transmit pulse shaping filter pair, at least one of the receive pulse shaping filter and the transmit pulse shaping filter having the required pulse shaping filter length, iteratively designing the sub-band filter and the receive and transmit pulse shaping filter pair by: based on a current design for said sub-band filter, redesigning the receive and transmit pulse shaping filter pair to fulfill the required pulse shaping filter length and to optimize a first performance measure; and based on a current design for the receive and transmit pulse shaping filter pair, redesigning the sub-band filter to have the required sub-band bandwidth and the required sub-band filter length and to optimize a second performance measure; and outputting new designs for the sub-band filter and for the receive and transmit pulse shaping filter pair when filter designs converge.

12. The non-transitory computer readable storage medium according to claim 11, wherein the computer readable program instruction comprises further instructions that when executed by the processor, configure the processor for:
when the filter designs fail to converge, adjusting communication system parameters and resuming the iterative designing.

13. A computer program product, comprising a computer readable program instruction; wherein when the computer readable program instruction is executed by a processor, the processor is configured for: using an electronic design automation system; specifying a required sub-band bandwidth, a required sub-band filter length and a required pulse shaping filter length; jointly designing a sub-band filter having the required sub-band bandwidth and the required sub-band filter length and a receive and transmit pulse shaping filter pair, at least one of the receive pulse shaping filter and the transmit pulse shaping filter having the required pulse shaping filter length, iteratively designing the sub-band filter and the receive and transmit pulse shaping filter pair by: based on a current design for the sub-band filter, redesigning the receive and transmit pulse shaping filter pair to fulfill the required pulse shaping filter length and to optimize a first performance measure; and based on a current design for the receive and transmit pulse shaping filter pair, redesigning the sub-band filter to have the required sub-band bandwidth and the required sub-band filter length and to optimize a second performance measure and outputting new designs for the sub-band filter and for the receive and transmit pulse shaping filter pair when filter designs converge.

\* \* \* \* \*

UNITED STATES PATENT AND TRADEMARK OFFICE
CERTIFICATE OF CORRECTION

PATENT NO. : 10,892,931 B2
APPLICATION NO. : 16/287776
DATED : January 12, 2021
INVENTOR(S) : Boehnke et al.

It is certified that error appears in the above-identified patent and that said Letters Patent is hereby corrected as shown below:

In the Claims

Claim 1, Column 18, Line 51: "wherein in the sub-band filter and at east one" should read -- wherein the sub-band filter and at least one --.

Claim 1, Column 18, Line 63: "measure," should read -- measure; --.

Claim 11, Column 20, Line 31: "filter length," should read -- filter length; --.

Claim 13, Column 20, Line 52: "program instruction;" should read -- program instruction, --.

Claim 13, Column 20, Line 62: "filter length," should read -- filter length; --.

Signed and Sealed this
Seventh Day of June, 2022

Katherine Kelly Vidal
*Director of the United States Patent and Trademark Office*